Sept. 19, 1950          J. C. CROCKER          2,522,862
PICKER AND PICKER STICK AND FASTENER THEREFOR
Filed Dec. 26, 1946
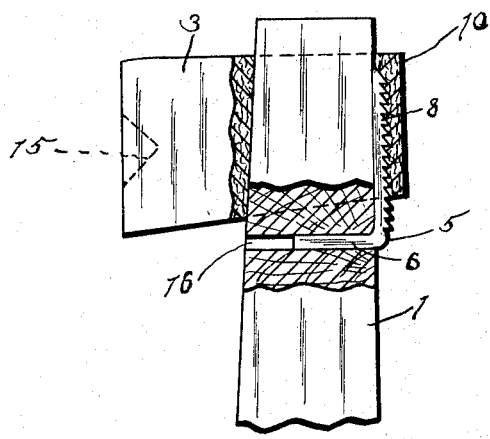
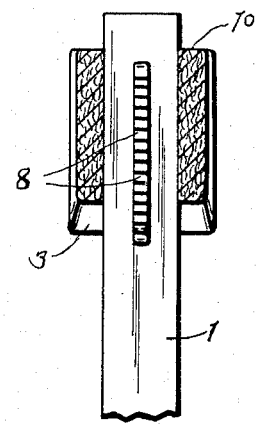
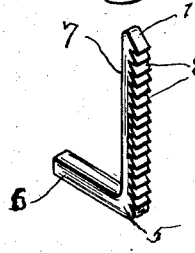
Inventor:
John C. Crocker
by James R. Hodder
Attorney Patented Sept. 19, 1950

2,522,862

UNITED STATES PATENT OFFICE 2,522,862

PICKER AND PICKER STICK AND FASTENER THEREFOR

John C. Crocker, Ware Shoals, S. C., assignor, by mesne assignments, to The Bullard Clark Company, Danielson, Conn., a corporation of Connecticut Application December 26, 1946, Serial No. 718,470

1 Claim. (Cl. 139—159)

My present invention is a novel and improved method of and fastening device for ready attachment and adjustment between a picker and a picker stick, which are utilized in loom operations.

In the usual type of attachment heretofore employed to hold a picker on a picker stick, it has been customary to drive tacks, nails, or bored holes, and to fit screws thru the walls of the loop portion of the picker which goes around the picker stick, driving such fastenings into the picker stick so as to hold the picker in proper alignment for contact with the shuttle point during the loom operations.

The attachment and positioning of the picker on the picker stick is of great importance in order both to hold the picker from being displaced or thrown off during the rapid oscillations of the picker stick itself, as well also to insure the proper alignment of the face of the picker for contact with the shuttle point. Usually the face of the picker is recessed or bored to facilitate the proper seating of the shuttle point on the picker.

It will be appreciated that the shuttle, being freely thrown back and forth, and the picker being swung in the oscillations of the picker stick, require careful relative adjustment. Also the picker is frequently worn out and has to be removed and replaced. These adjustments and replacements necessitate a number of different holes and fastenings being driven into the same, which, of course, weaken the picker stick at this portion.

These adjustments of the picker and picker stick are usually matters of guesswork and judgment, and these still further involve a number of holes being formed and fastenings driven in to hold the picker and picker stick in position.

These difficulties are still further accentuated where a laminated picker stick is employed, the holes and fastenings being frequently driven thru between the layers of the laminated picker stick and, hence, tending to weaken and injure the same.

My present invention is directed to obviate the difficulties above briefly outlined and to provide an improved fastening between the picker stick and picker which will readily permit adjustments to be effected without damage or injury to the picker stick, and which will enable a fastening element to be permanently attached at a predetermined point on the picker stick and to effect all adjustments thereon without making additional holes or driving other weakening fastenings therein.

In carrying out my invention, I provide a fastening element which can be conveniently fitted to that portion of the picker stick about which the loop of the picker is to be applied, and thereupon fit the picker over the picker stick and the fastening element and which will automatically retain the picker and picker stick in desired adjusted position. This fastening element is also constructed and arranged so as to permit vertical adjustment of the picker and stick and also to prevent the picker from being disaligned from the shuttle-receiving position to which it has been adjusted.

Referring to the drawings illustrating a preferred embodiment of my invention, carrying out my novel method of uniting a picker and picker stick:

Fig. 1 is a fragmentary side view partly in cross-section illustrating my fastening element holding a picker and picker stick in adjusted position;

Fig. 2 is a rear view with the fastening element in position and with the picker shown in cross-section; and Fig. 3 is a perspective view illustrating the preferred form of my fastening element.

Referring to the drawings, 1 designates the upper portion of a typical picker stick on which a standard type of picker 3 is assembled, together with my novel fastening element designated generally at 5. My novel fastening element is of L-shaped form comprising a horizontal section 6 and an upstanding arm 7, the latter carrying a plurality of serrations, corrugations, prongs, or notched elements 8, which prongs are preferably formed in a predetermined slanting direction, as shown. This direction is downwardly when the fastening element is fitted to the picker stick 1 to more effectually prevent the picker being thrown off by centrifugal force during the rapid oscillations of the picker stick.

These corrugations, notches, or prongs, however, can be in other forms, if desired, and are intended to engage with and impinge into the rear or loop part 10 of the picker when the picker is forced down over the same in the assembling operation on the picker stick. The upper, or topmost portion, of the arm 7 of my novel fastener is bevelled, as shown at 12, to facilitate the fitting, sliding, or driving of the loop portion 10 of the picker thereover when fitting the same on the stick.

My novel fastening element 5 can be of any suitable material, preferably metal, and may be of any suitable or desired length, preferably sufficient to allow for the full range of vertical adjustments of the picker 3 on the picker 1 in the particular loom to which the same may be attached so as to provide proper adjustment of the shuttle-receiving recess in the face of the picker, as indicated in dotted lines at 15, to be in alignment with the line of travel of the shuttle point in its traverse of the shuttle box.

My novel fastening element can be secured to the picker stick in any desired manner but, preferably, as herein shown with the shorter or lower part of the L-shaped member 6 adapted to be slid or driven into a bored opening 16 in the picker stick, as shown in Fig. 1. Thus, with the fastening element 5 fitted to the picker stick, as many adjustments as may be desired or necessary can be effected with relative movement of the picker on the picker stick, or an old worn picker can be removed and a new one applied without driving holes or boring recesses in the picker stick.

The loop can be moved down or slid upwardly over the corrugations or notches 8, and when the shuttle-receiving recess in the face of the picker is in the correctly adjusted position then a slight blow of a hammer on the back of the loop 10 will impinge the notches 8 into the material of the loop and thus securely hold the picker and picker stick together.

While my improved fastening element can be fitted at any point desired, I prefer to bore the opening 16 in substantially the longitudinal middle line of the picker stick so that the upper arm 7 of the fastener and the prongs 8 will engage the middle portion of the loop 10 and, thus, also maintain the entire picker and head in balanced relation.

Thus, my method of removably and adjustably securing a picker on a picker stick with a single fastening element, eliminating the driving of nails, tacks, screws, or such fastenings and borings for the same, wherein the fastening element can be permanently left assembled with the stick, is believed to be novel, and I wish to claim this method of attachment herein.

I claim:

A fastener for uniting a picker and picker stick comprising a rigid metallic L-shaped element having its arms extending at right angles to each other, the shorter arm being adapted to be detachably fitted in a recess in the picker stick and to be housed therein with the longer arm extending vertically in contact with the outside of said picker stick, said longer arm having a bevelled wedge shaped top portion and a series of picker engaging teeth on its outer lengthwise portion, whereby the loop portion of a picker may be driven down over the fastener and the engagement with the bevel of the top and said teeth in said longer arm will hold the picker in adjusted position.

JOHN C. CROCKER.

REFERENCES CITED

The following references are of record in the file of this patent:

UNITED STATES PATENTS

| Number | Name | Date |
| --- | --- | --- |
| 32,770 | Holbrook | July 9, 1861 |
| 996,670 | Peckham | July 4, 1911 |
| 1,441,802 | Hannon | Jan. 9, 1923 |
| 1,517,768 | Towers | Dec. 2, 1924 |
| 1,575,598 | Gagnon | Mar. 2, 1926 |